United States Patent [19]

Soo

[11] Patent Number: 4,976,463
[45] Date of Patent: Dec. 11, 1990

[54] HEATING SYSTEM FOR VEHICLE

[75] Inventor: Yang K. Soo, Seoul, Rep. of Korea

[73] Assignee: Hanil Industrial Co., Ltd., Seoul, Rep. of Korea

[21] Appl. No.: 323,755

[22] Filed: Mar. 15, 1989

[30] Foreign Application Priority Data

Jun. 30, 1988 [KR] Rep. of Korea ............... 88-7979[U]

[51] Int. Cl.⁵ .............................................. F24D 3/00
[52] U.S. Cl. ............................... 237/8 C; 237/12.3 B; 237/12.3 C; 431/11; 431/208; 431/263; 431/185; 431/79; 417/417
[58] Field of Search ............ 237/12.3 C, 8 C, 12.3 B; 431/8, 11, 79, 207, 208, 258, 259, 240, 263, 185, 187, 188; 417/417; 122/13 R; 236/25 A

[56] References Cited

U.S. PATENT DOCUMENTS

| | | | |
|---|---|---|---|
| 3,117,619 | 1/1964 | Lange et al. | 431/263 X |
| 3,758,031 | 9/1973 | Moran | 237/12.3 C X |
| 4,116,591 | 9/1978 | Mardell | 417/417 |
| 4,171,771 | 10/1979 | Colthorpe et al. | 236/25 A |
| 4,373,666 | 2/1983 | Williams | 237/12.3 B |
| 4,590,888 | 5/1986 | Mosig | 237/12.3 C X |
| 4,613,072 | 9/1986 | Kikuchi et al. | 237/12.3 C |
| 4,718,602 | 1/1988 | Beck et al. | 237/12.3 C X |

Primary Examiner—Albert J. Makay
Assistant Examiner—John Sollecito
Attorney, Agent, or Firm—Beveridge, DeGrandi & Weilacher

[57] ABSTRACT

This invention relates to an auxiliary heating system for vehicles which is intended for effective heating of vehicles by installing it together with a pre-existing vehicle heating system. This invention utilizes a modified boiler with an improved burner as a heat source instead of engine waste heat. In addition, the invention features various kinds of safety devices. The invention provides for increased efficiency in the heating of a vehicle and yet represents an inexpensive heating system. The invention also expands the scope of vehicles in which the above heating system can be installed by decreasing the weight and lessening the size of the boiler.

20 Claims, 9 Drawing Sheets

HEATING SYSTEM FOR VEHICLE

FIELD OF THE INVENTION

This invention relates to a heating system for vehicles which is intended for effective heating of vehicles by installing it together with a pre-existing vehicle heating system utilizing engine waste heat as its source of heat.

BACKGROUND OF THE INVENTION

Conventionally, a well-known prior heating system utilizes heat produced by a vehicle engine when the vehicle is operating or running. The prior art heating system utilizes a number of pipes which connect the heater with the engine and radiator so that the water flowing in the pipes can transmit the heat produced by the engine to the vehicle's heater while cooling down the heated engine at the same time. The prior art heating system, however, has the problem of time delay (about 30 minutes, or one hour in the cold winter) in achieving the proper vehicle heating mode. That is, to supply the required heated air for proper functioning of the vehicle heater, there is a long delay as the engine itself heats up. Specifically, in the case of commuting vehicles which often make several stops and are parked for various lengths of time, the engine is either kept idling to maintain the required engine temperature or the vehicle is shut off requiring the operator to again wait as the engine sufficiently heats up to an operational temperature. The idling of the engine, either to maintain the pre-existing engine temperature or raise the engine temperature to the desired level, lessens the life span of the engine through continuous or added operation. The requirements of such prior art heating systems also cause economic loss due to unnecessary consumption of fuel. Similar problems also exist with respect to vehicles being relied upon for extended periods of travel in that the engine must be kept idling during periods when the engine is being rested. Furthermore, when it is the operator who desires rest, the user of the vehicle is subject to the noise and vibration associated with an idling engine and often finds sound rest unavailable As a solution to these problems, an auxiliary heating system for vehicles is already known which provides heat to vehicles when the vehicle engine is stopped and the vehicle is parked. However, the above auxiliary heating system employs a boiler which is structured such that the heat produced by burning fuel fails to provide the desired degree of heating due to low heat efficiency. This low heat efficiency causes an increase in the consumption of fuel which often proves to be uneconomical.

Another disadvantage of the prior auxiliary heating systems is that the boiler forming part of the heating system is too heavy and large in size to be installed in the limited space of the vehicle. It is also often difficult to install the prior art auxiliary heating systems thus making it is expensive to install such systems. Accordingly, such systems are applied only to specially designed vehicles which often turns out to be unrealistic from an economic standpoint Another disadvantage of the prior art auxiliary heating systems is the frequent breakdowns due to misuse and a lack of safety devices. Also, in the worse cases, the lack of sufficient safety devices leaves open the possibility of an explosion or fire which can claim precious human life or cause the loss of property.

These disadvantages have prevented the general public or users from adopting the prior art auxiliary vehicle heating systems.

SUMMARY OF THE INVENTION

With regards to these problems or disadvantages, this invention provides a modified vehicle heating system which includes a modified boiler having an improved burner as a heat source instead of engine heat. The present invention also incorporates various kinds of safety devices while maintaining increased heat efficiency for the effective heating of the vehicle. This invention also provides an inexpensive heating system which can be installed on a wide range of vehicles due to a decrease in the weight of the system and a lessening of the size and weight of the boiler. The main objective of this invention is to provide a vehicle heating system which can be used safely and efficiently by the user and which has low installation and maintenance costs so as to make it economical.

DETAILED DESCRIPTION OF THE INVENTION

The exemplary embodiments of the invention as shown in the drawings are described as follows.

Figure 5:
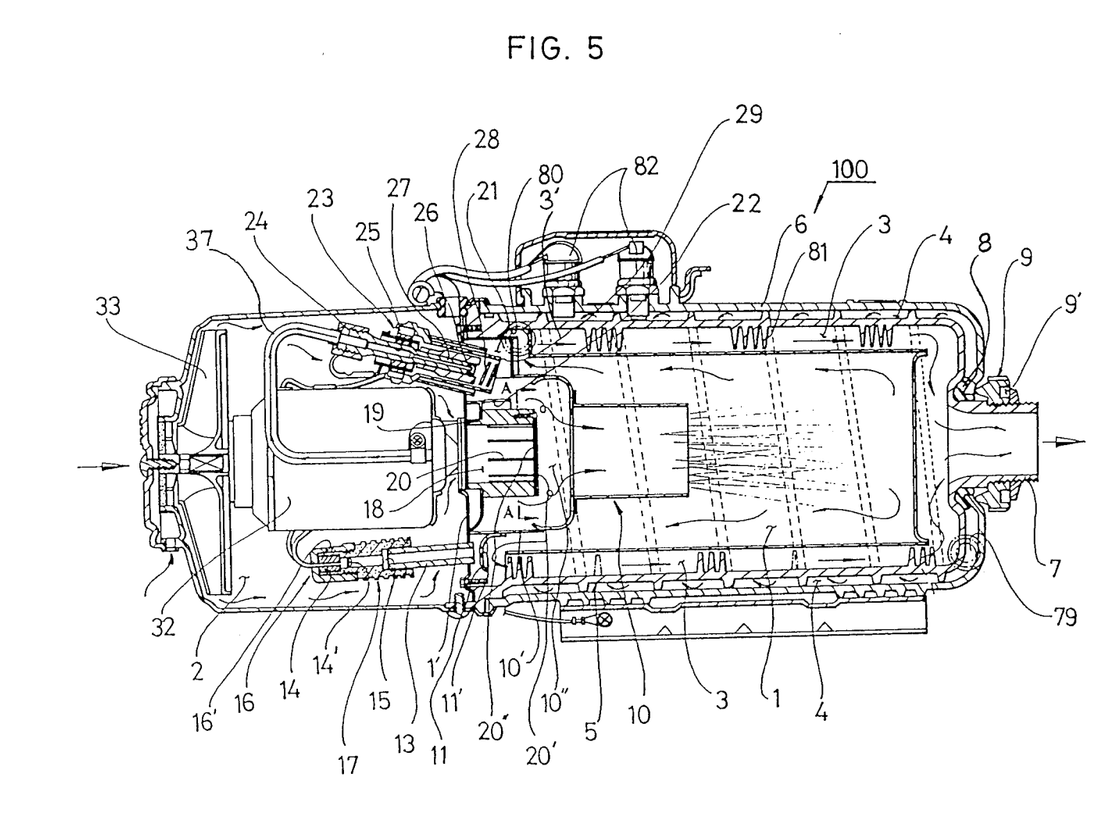
FIG. 5 is a sectional inner view of a boiler which constitutes a part of the invention.
Figure 10:
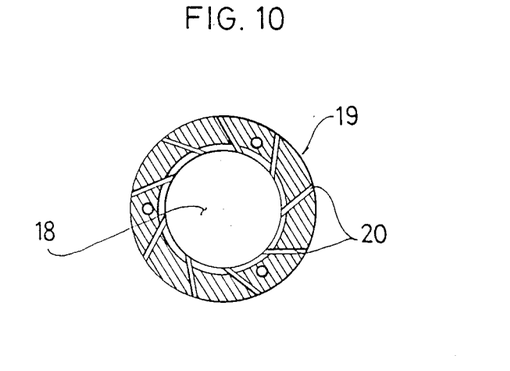
FIG. 10 is a sectional view of an air eddy device taken along the line A—A of FIG. 5.
Figure 11:
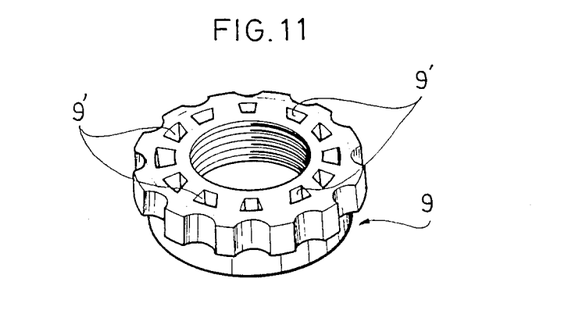
FIG. 11 is a perspective view of a radiator device which is a component of the boiler which constitutes a part of the invention.
Figure 12:
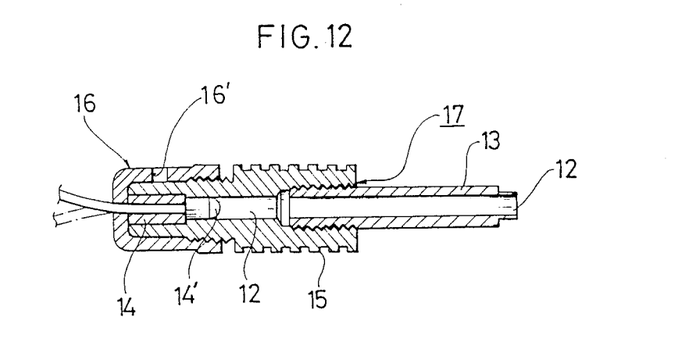
FIG. 12 is a sectional view of a flame sensing device which constitutes part of the invention.
Figure 13:
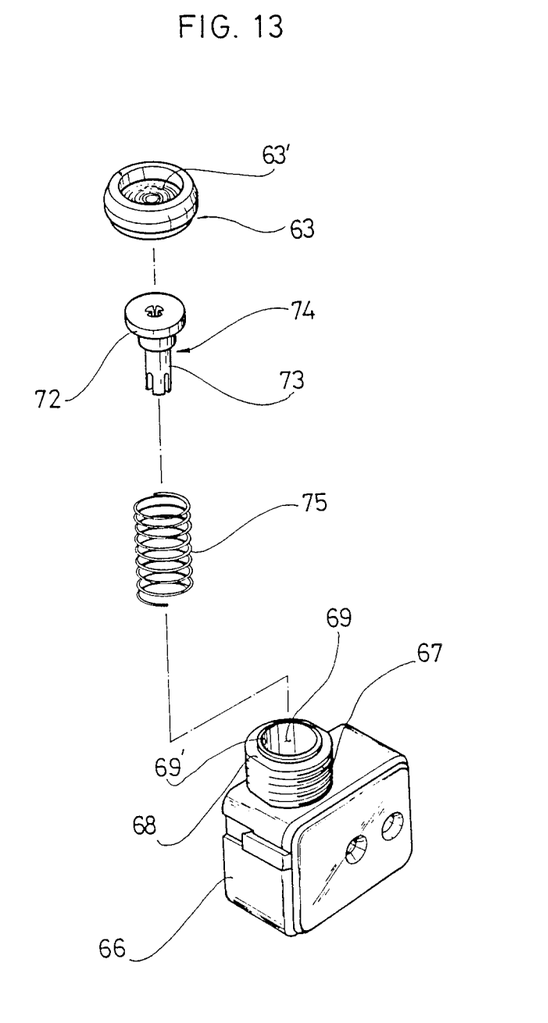
FIG. 13 is a fragmentary perspective view of the water flow switch in FIG. 6.

As illustrated in FIG. 5, the present invention has a boiler structure (100) including combustion chamber(1), blowing chamber(2), and an aluminum heat exchanger(5) which forms the external boiler structure. The boiler structure(100) also includes water jacket (6) which can be made of engineering plastics so that exhaust gas passage(3) and the helical form of water passage(4) can be easily formed The boiler structure (100) further comprises exhaust port(7) which is integrally formed with heat exchanger(5) and extends out away from the main body of heat exchanger (5). Gasket (8) is inserted into the space which exists between exhaust port(7) and water jacket (6). Gasket (8) is preferably made of rubber so as to have the property of low heat transfer and to be essentially fire proof. Radiator device (9) having radiation space(9') is provided so that heat from the exhaust gas exiting exhaust port(7) can be transmitted to water jacket(6) in a manner which avoids plastic deformation of water jacket(6). One front side of the said combustion chamber(1) is blocked and inlet (3') of exhaust gas passage(3) is provided on the down side of combustion chamber (1). Exhaust gas guide plate(11) has light passage hole(11') formed on one side of burner compartment (10') in the combustion chamber(1). Combustion chamber (1) has a 3-path type design wherein the exhaust gas is led to exhaust gas passage(3) which results in the exhaust gas circulating and then exiting exhaust port(7) via exhaust gas passage (3). An appropriate length connecting tube(13) is welded onto compartment plate(1') of combustion chamber(1) so as to correspond with light passage hole(11') in the exhaust gas guide plate(11). The end surface of connecting tube (13) is threaded and mesh's with insulation cap (15). Flame eye(14) is also threadably received in insulating cap (15). Insulation cap(15) is preferably made of phenol resin and has a light absorbing hole (12) so that combustion heat in the combustion chamber(1) is kept to a minimum. Light absorbing part (14') is nestled within light absorbing hole (12). The outer surface of insulation cap(15) is formed unevenly in order to increase the heat radiation effect. Protection cap(16) meshes with insulation cap(15) so that flame eye(14) can be engaged with one side of insulation cap(15) and there is a hole(16') in the protection cap(16) to foster the heat radiation effect. And thus connecting tube(13), insulation cap (15) and flame eye(14) constitute the main body of the sensing means(17). Also, ignition sensor(17) is secured in order to have light absorbing part(14') with flame eye(14) sense the light which passes through light passage hole(11') when burner(10) in combustion chamber(1) is ignited. In the center of burner combustion room (10") of the burner there is positioned air swirling device 19 (FIGS. 5 and 10) having formed therein combustion chamber blast hole(18). Air swirling device (19) also includes a plurality of air passages (20) provided at a slant angle and which extend from blast hole (18) to the outside of air swirling device (19). Air swirling device (19) is mounted so as to change the inflowing air into a vortex air flow as it passes through said air passage holes (20). On the front side of air swirling device (19) is mounted blocking plate(20') which acts to prevent the air passing through air swirling device (19) from passing directly into the combustion chamber 11). Said blocking plate (20') has a plurality of air passage holes (20") which are at a fixed distance from one another. On the upper side of burner combustion room(10"), vaporizing room (21) is provided. Guide plate (22) is disposed on the dividing plate between vaporizing room(21) and air swirling device(19) to guide the cool vortex air flowing into the combustion chamber and prevent the cool vortex air from flowing into the vaporizing room(21) which would reduce vaporization efficiency.

Figure 8:
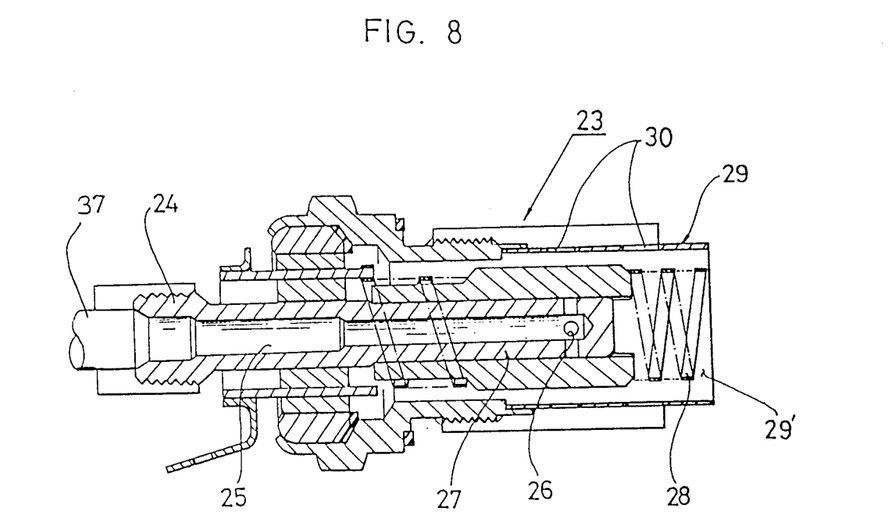
FIG. 8 is a sectional view of an ignition plug forming a part of the present invention.

As shown in FIGS. 5 and 8 ignition plug(23) on compartment plate(1') is provided so that the edge of ignition plug(23) is positioned between vaporizing room(21) and burner combustion room(10"). On the backward edge of plug(23), fuel supply tube connector (24) is provided and fuel passage(25) is also formed in the center of ignition plug(23). Core (27), having fuel outflow orifices(26), is mounted inward of ignition plug (23) and heat coil(28) is mounted spirally outside of core (27). In the outside portion of compartment(29), next to said heat coil(28), a plurality of fuel outflow holes(30) are provided and opening(20') is formed on the front side of ignition plug(23). When the heating system is in operation, heat coil(28) of ignition plug (23) is heated (about 1200° C.) so as to vaporize instantly the liquid fuel flowing out of fuel outflow orifices (26). The vaporized fuel is supplied through fuel outflow holes (30) and opening(29') into the vaporizing chamber(21) and burner combustion chamber(10"). Ignition plug (23) is thus capable of igniting unlit burner 10. When burner 10 is ignited, ignition plug (23) is shut off from the electric circuit by the operation of ignition sensor(17). Burner 10 also includes driving motor(32) and blowing fan(33) which are used to blow air into the combustion chamber(1) to facilitate combustion.

Figure 3:
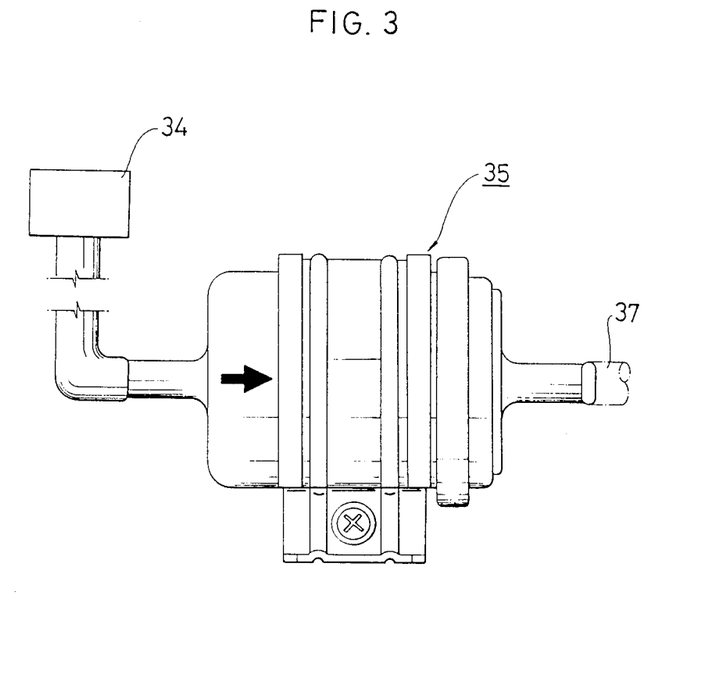
FIG. 3 is a front view of a fuel filter which constitute a part of the invention.
Figure 4:
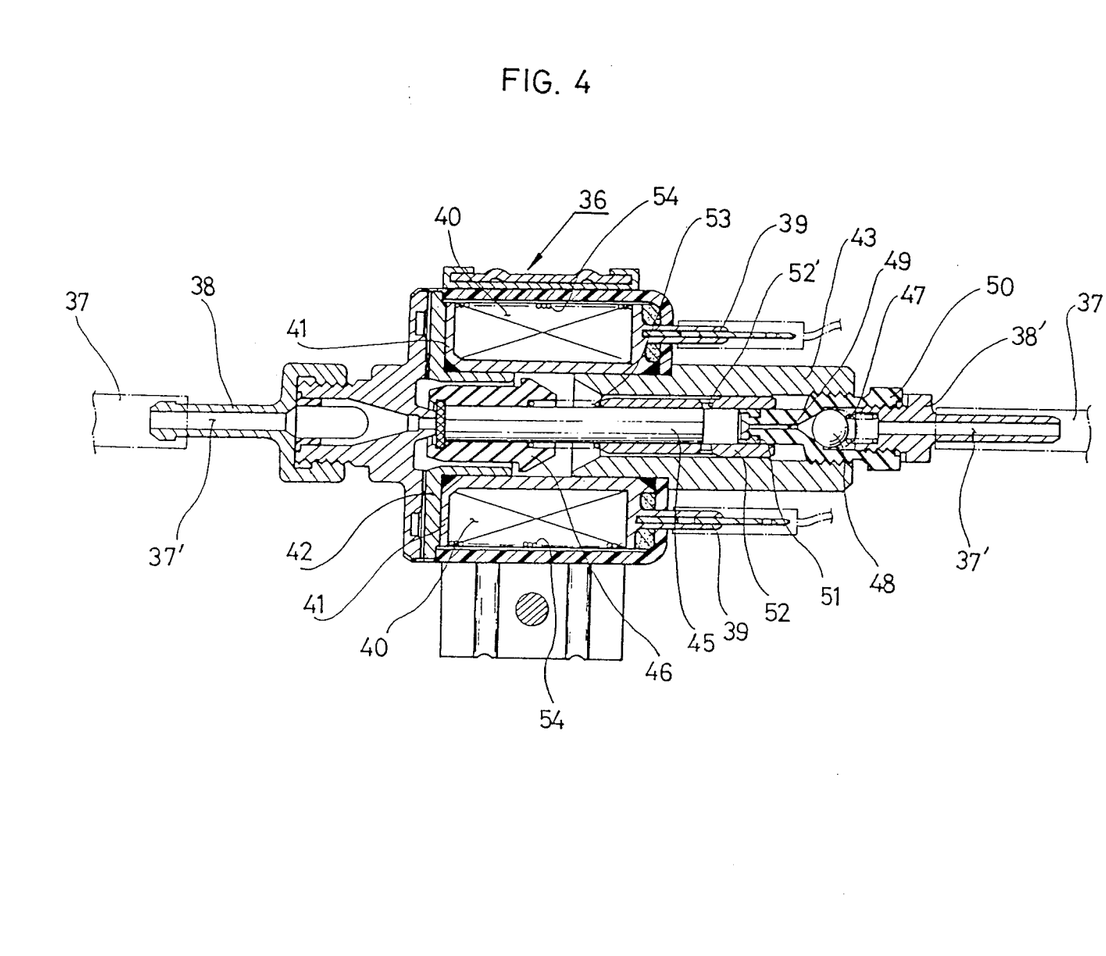
FIG. 4 is a sectional view of a dosing pump which constitutes a part of the invention.

Fuel for combustion is supplied continuously during operation and as shown in FIGS. 3 and 4 the fuel supply system includes fuel tank(34) (in vehicle), known fuel filter(35), dosing pump (36), and fuel passing tube(37) which connects fuel filter (35) and dosing pump(36).

Fuel passing tube connectors(38)(38') having fuel passageways (37') are secured to both end sides of dosing pump(36). Hollow driving core holder(42) and hollow fixing core(43) are positioned in the inner bore of coil frame(41). Dosing pump (36) further includes electric were terminal plate(39), coil (54) and coil reservoir(40). Driving core(46) in which piston(45) is inserted and fixed is provided in the inner diameter of coreholder(42). Fuel passing tube connector(38') is secured onto the one inner diameter of fixing core(43) and compression spring(47) and check valve(48) are mounted inward of fuel passing tube connector (38'). Setting screw(50), which includes fuel passing hole(49), is provided with its one end inserted into shock absorbing ring (51). Piston(45) reciprocates slidably through the one inner bore between actuating core(46) and setting screw(50). On the opposite end of the inner bore, excluding the movable distance of piston (45), the outer diameter of spring screw(50) is inserted fixingly into oil less bearing(52) and fuel passing hole(52') is formed. Whereas, by inserting compression spring(53) between actuating core(46) and oil less bearing(52), actuating core(46) can be biased to return to its initial position after being forced forward by the electric power in coil (54). Dosing pump (36), when in operation, is designed to maintain piston (45) reciprocating. By connecting electricity to spiral coil(54) secured within coil reservoir (40) of coil frame(41), actuating core(46) is forced forward such that strong absorbing power is produced This absorbing power created by the reciprocating piston causes fuel in tank(34) to be drawn into the bore of dosing pump through the fuel filter(35) and flows into the space between actuating core(46) and actuating core holder(42).

Due to the back pressure created in the fuel passageways 37', when actuating core (46) returns due to the compressive force of compression spring (53), fuel flows through fuel passing hole(52') of oil less bearing(52) into the space between piston(45) and setting screw(50). If actuating core(46) goes forward again, there is a flow of fuel produced by the compressive force of piston(45) through fuel passing hole(49) formed in setting screw (50). The flow of fuel deactivates check valve(48) which is in an elastic state and the fuel is then directed to ignition plug(23) via fuel passageway(37') of fuel passing tube connector(38'). This procedure is repeated in accordance with the flow of electric power to coil(54). As shown in FIG. 4, if piston(45) moves to the left, check valve 48 moves to the initial position due to the spring force of compression spring(47). Thus fuel, maintained at an appropriate pressure is supplied unceasingly to the combustion chamber(1) and this completes the fuel supply means.

The water circulating means, which transmits heat received from boiler(100) to the heating system of vehicles, is composed of a pipeline system which circulates water past vehicle engine(55), radiator(56), known water pump(57), boiler (100), water flow switch (58) and a vehicle heater (59). In addition, control valve (60) is disposed between water flow switch(58) and vehicle heater (59) so as to check whether circulating water is flowing into vehicle heater (59) or not. In front of vehicle heater (59) bypass-line(60-1) is provided so that water can flow into engine(55) without passing vehicle heater(59) even if control valve(60) is not opened in operation by the carelessness of a user. Without Bypass-line(60-1) there exists the possibility of an unexpected accident as the flow of water could be interrupted if the operator failed to activate control valve (60).

Figure 6:
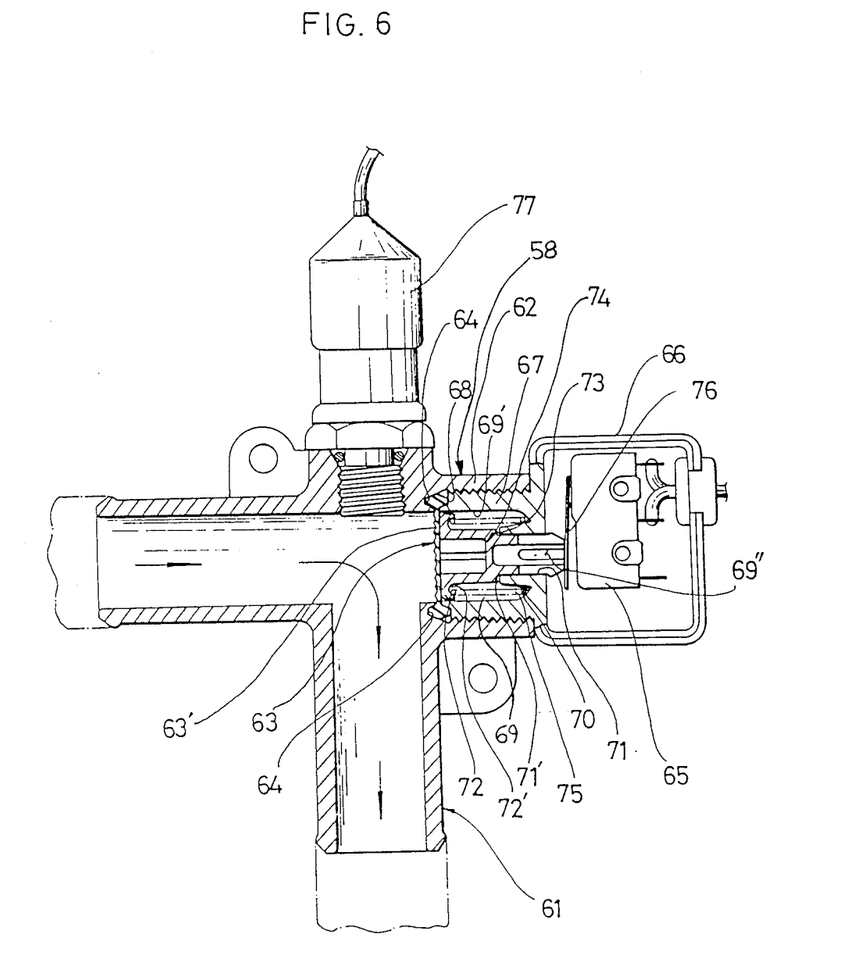
FIG. 6 is a sectional view of a water flow switch which constitutes a part of the present invention.
Figure 7:
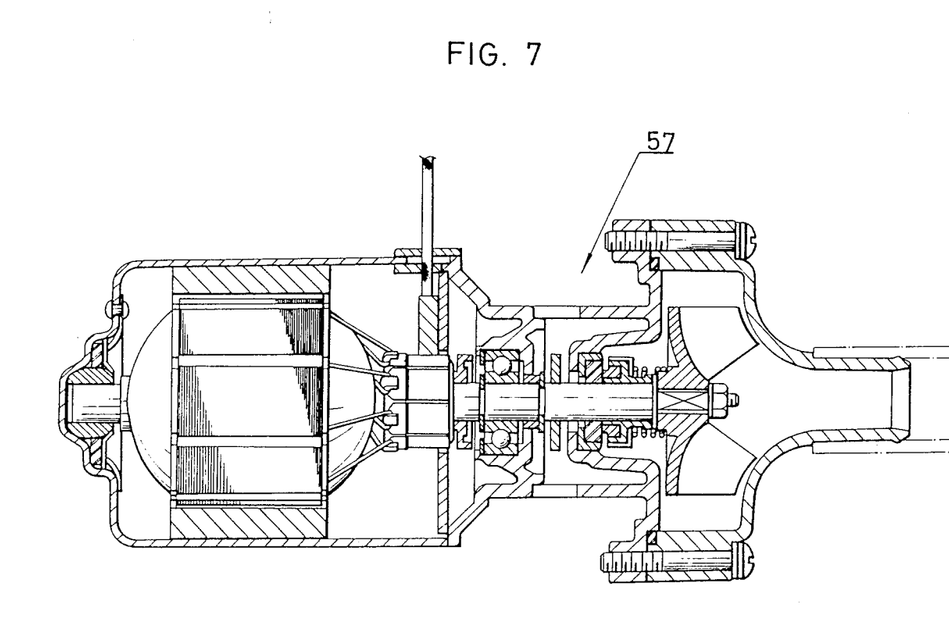
FIG. 7 is a sectional view of the water pump which constitutes a part of the invention.

Water flow switch(58) is provided to prevent unexpected fire or explosion when the water remaining in heat exchanger(5) is heated to a high temperature and subjected to high pressure instantly by the heat transmitted from the combustion device of boiler. Such a situation may develop because of alien substances flowing in the pipe line even though water pump(57) is in operation. As shown in FIG. 6, water flow switch(58) cooperates with a bent section of the water circulating pipe system and, on one side of water circulating pipe(61), connecting member(62) is provided Connecting member (62) has an annular groove around an inner bore formed therein such that flexible silicon diaphragm (63), which has wrinkle shape(63'), can be inserted The bore formed in connecting member (62) is threaded so that engaging part(67) protruding from the upper part of the case(66), which includes microswitch(65) therein, can be threadably engaged. By proper positioning of supporting jaw part(68), diaphragm(63) can be inserted tightly between insert groove (64) and the supporting jaw part (68). Actuating rod (74) is positioned within engaging part (67) so as to form upper hole (69') therebetween. In addition, actuating rod (74) has a bore which defines down hole (69"). The diameter of upper hole(69') is different from the diameter of down hole (69"). Engaging part (67) is formed so as to include spring inserting hole(70), supporting edge(71) and jaw portion(71'). By positioning the outer circumferential edge of upper jaw (72) in upper hole(69') and by positioning the outer circumferential edge of downward actuating rod(74') in down hole (69"), actuating rod(74) is able to move freely between upper hole(69') and downhole(69"). Furthermore, by forming inserting groove(72') under upper jaw (72) and securing elastic compression spring(75) within upper hole(69'), actuating rod(74) can be axially biased. An edge of actuating rod(74) contacts with contacting metal(76) of micro switch(65) and if actuating rod(74) moves axially to a predetermined point, rod(74) comes in contact with jaw portion(71') and is prevented from further axial movement Diaphragm(63), which is inserted between inserting groove(64) and supporting jaw part(68), is adapted to be bent axially by the pressure produced by the forced water circulation. Axial bending of diaphragm (63) pushes actuating rod(74), which is disposed next to diaphragm (63), into contact with contacting metal(76) so as to turn microswitch(65) on.

If water is not circulating, actuating rod(74) returns to its biased position due to compression spring(75) and microswitch (65) is turned off.

Water flow switch(58) having a known temperature sensor (77) which senses whether water circulating through the pipe line is at an appropriate temperature (about 80° C.) is disposed between boiler(100) and vehicle heater(59). This positioning of the water flow switch 58 ensures that the water passing through boiler(100) can flow into vehicle heater(50) via flow switch(58) so as to provide water circulating means for the heating of a vehicle.

Figure 9:
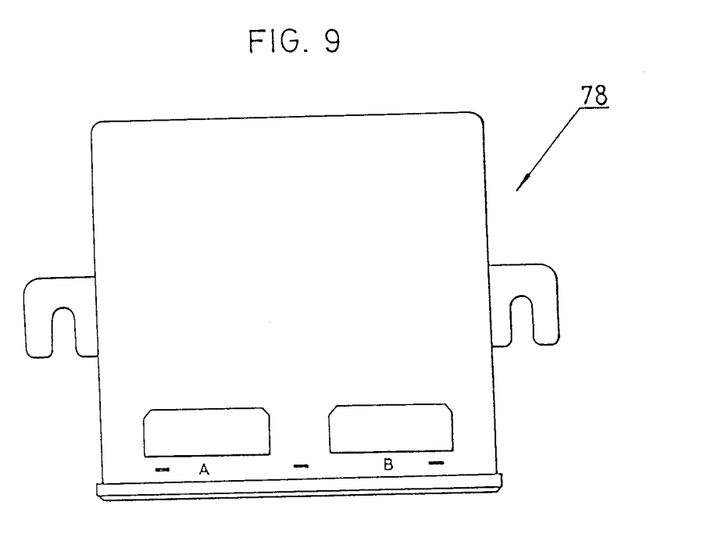
FIG. 9 is a front view of control box which constitutes a part of the invention.

The present invention also includes a control box (78) having total control means for controlling the above-mentioned components. The control box can be provided to control all the necessary components which have been described up to now for this invention or, alternatively, the control box can include control means for controlling the heating system of the present invention in conjunction with a known vehicle heating system.

Figure 1:
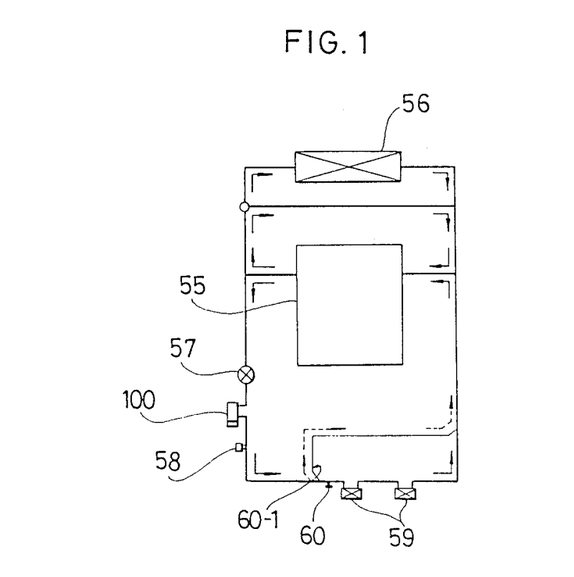
FIG. 1 is a schematic representation of a first embodiment of the present invention.
Figure 2:
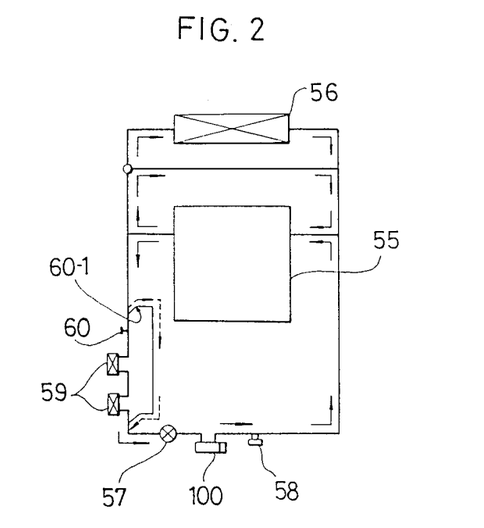
FIG. 2 is a schematic representation of a second embodiment of the present invention.

Referring again to FIG. 5, there is depicted numerical 79 which represents the water inlet of boiler(100) numerical 80 represents the water outlet of boiler (100) numerical 81 represents a heat transmitting fin and numeral 82 a temperature sensor. In the situation where a piping system of a prior heating system for a vehicle can not readily be used with the present invention, either because of the structure of the known heating system or because of the structure of the vehicle itself, the present invention can be easily adapted for use in such situations. As shown in FIG. 1, known vehicle heater(50), water pump(57), boiler(100) and water flow switch(58), in the order illustrated, are connected by tubing with the pipeline extended from vehicle engine(55) and radiator(56). Control valve (60) is placed near the vehicle heater to control inflow and outflow of the circulating water in the pipeline and bypass-line(60-1) is provided to connect the line from water flow switch 58 with the forward line of water pump(57) in order to prevent the unexpected accident which seems to happen due to the closing of control valve(60). That is control valve (60) keeps water from circulating in pipeline during operation and, upon operating water pump (57), water passes through boiler(100) to be circulated via water flow switch(58), engine(55), radiator (56) and vehicle engine to heat the vehicle's interior.

The detailed description of the operation and effect of this invention is as follows: The fuel supply means is composed of fuel tank (34), fuel filter (35), dosing pump (36), and ignition plug (23) connected with fuel passing tube (37). If dosing pump(36) is in operation, then fuel absorbed from fuel tank(34) which is brought about by the reciprocating activity of driving core(46) and piston(45), passes through fuel filter(35) and flows into the space between piston(45) and setting screw (50). If driving core(46) moves forward again, then the pressure created by piston (45) causes the flow of fuel to push check valve(48) into an open position and fuel to flow to ignition plug(23) and then into fuel passage(23). The fuel exits fuel outflow orifices (26) and is then vaporized into a high polymer state by the heat of the heat coil which is heated by an electrical source as it into vaporizing chamber (21) and burner combustion chamber(10"). The fuel is then ignited in burner(10). If ignition occurs, the light passes through light passing hole(11') and reaches ignition sensor(17) of flame eye(14) and, by operation of said ignition sensor(17), the electrical source to dosing pump 36 is disconnected. When vaporized fuel is ignited in combustion chamber(1), the air being circulated by blowing fan(33) is sent into vortex mixing contact with the vaporized fuel in combustion chamber to burn. When fuel supplied in combustion chamber(1) starts to burn, the temperature of burner combustion chamber (10") rises rapidly causing a rise in temperature in vaporizing room(21) on the upper side of burner combustion chamber(10"). This rise in temperature, in turn, heats the fuel supplied such that the fuel supplied vaporizes in high polymer so as to be burn efficiently. Guide plate(22), provided on the dividing plate(1') plays a role in preventing the cool air from being blown into combustion chamber in vortex fashion through air passage hole(20) of air swirling device (19) from skipping vaporizing room(21) and not efficiently mixing with the fuel. Combustion heat produced by the burning fuel supplied circulates through combustion chamber(1) and passes through exhaust gas passage(3) by induction of exhaust gas guide plate(11) and is discharged by the above-mentioned three-path method. In this procedure, most of the high temperature combustion heat is transmitted to heat exchanger(5) and exhausted so as to maximize efficiency of heat use and avoid heat loss which can result in low temperature of exhaust gas.

Heated exhaust, exiting exhaust port(7), is mostly insulated from the combustion chamber covering through use of an essentially unburnable rubber gasket(8) having low heat conductivity. The heated exhaust from radiating plate(9) attached to exhaust port(7) circumferentially so that the temperature of exhaust port(7) be lowered enough to form water jacket out of engineering plastic which can last under the temperature of 150° C.

Water circulating in the system used for transmitting combustion heat to heater(59) flows by the operation of water pump(57) through water inlet(80) of boiler(100). In addition, the water circulates through water flow passage(4) in helical fashion so as to efficiently transmit combustion heat to heat exchanger(5) for effective heating of vehicles.

Water flow switch (58) is provided as a safety device and it senses whether the water is properly circulating in the pipeline so as to prevent an unexpected accident caused by the inflow of an alien substance or pipeline detect. Bypass-line (60-1) also plays a role in preventing unexpected accidents which would take place when water is unable to circulate in the pipeline due to the carelessness of a user who fails to open control valve even though water pump(57) is in operation. These features of this invention provide an added degree of safety to the user of the heating system. In this invention, vaporizing room(21) is located in combustion chamber(1) to maintain a high temperature in order to vaporize the fuel supplied in polymer state and thus safe on consumption of fuel by maximizing the efficiency of combustion. By exhausting exhausted gas heated by combustion by way of the three-path method, not only is heat efficiency improved, but there is also a minimization of heat loss made possible when the exhausted gas comes out of exhaust gas port(7) after most of the heat is transferred to heat exchanger(5). It is also possible to form water jacket(26) out of engineering plastics which has the property of high strength, lightness, and a heat resisting temperature of 150° C. The use of the three-path method as well as the gasket and radiating device achieves a relatively low temperature at the usually high temperature exhaust gas port(7) and allows for an essentially complete transfer of most of the heat generated by combustion. The design of the present invention also makes it possible to install this invention in all vehicles except very small cars which have a very limited space for installation. This adaptability of the present invention stems, for the most part, in the making of boiler(100) small and light and by forming water jacket(26) with engineering plastics that have the property of lightness and strength. Since this invention is possible to operate when a vehicle is stopped, it could increase the efficiency of an engine by warming up the engine before driving in the winter and thus it could extend the life span of an engine(55). This invention also has the advantage of providing a driver or passengers with a pleasant and safe atmosphere by installing water flow switch(58), bypass-line(60-1) and temperature sensor as a safety device. The present invention also has the advantage of being low in cost and practical by lessening the costs of manufacturing and maintenance.

While we have shown and described with respect to specific details of preferred embodiments, the disclosure is not intended to limit the scope of this invention as set forth in the following claims.

What is claimed is:

1. A heating system for use with a vehicle having a radiator and an engine, comprising:
   a boiler which includes means for introducing a fuel, a burner, means for introducing a combustible gas, and a combustion chamber;
   a heating unit for directing heat to the vehicle;
   a fluid circulation system for circulating a fluid past the vehicle radiator and engine as well as said boiler, said fluid circulation system comprising a main line which divides into a branch line and a bypass-line, said branch line directs the fluid past said heating unit and said bypass-line directs the fluid around said heating unit and back into communication with said branch line such that the fluid avoids contact with said heating unit; and
   control valve means for determining whether the fluid avoids or comes in contact with said heating unit, and wherein said boiler includes a fluid jacket formed of a plastic material, a casing defining said combustion chamber and a heat exchanger positioned between said casing and said fluid jacket, said heat exchanger including a protruding exhaust gas conduit at one end which extends through an opening formed in said fluid jacket, said boiler further including a gasket formed of a material which conducts heat at a rate which is less than that of said casing, said gasket surrounding said exhaust gas conduit and being positioned so as to prevent the portion of said fluid jacket defining the opening in said fluid jacket from coming in contact with said exhaust gas conduit, and said heating system further comprising a radiating cap surrounding and secured to said exhaust gas conduit, said radiating cap including a projection which is dimensioned so as to compress the portion of said fluid jacket defining the opening in said fluid jacket into contact with said gasket.

2. A heating system as recited in claim 1, wherein said boiler includes a fluid jacket, a combustion chamber casing and a heat exchanger positioned between said casing and said fluid jacket, said casing and said heat exchanger being dimensioned and arranged such that exhaust gas from said burner first travels in a first axial direction away from said burner while within said casing, and then in a second axial direction towards said burner while within said casing, then back in the first direction while between said casing and said heat exchanger and then out an exhaust conduit formed in said heat exchanger.

3. A heating system as recited in claim 2, wherein said heat exchanger includes a plurality of radiating fins extending off of said heat exchanger and towards said casing.

4. A heating system for use with a vehicle having a radiator and an engine, comprising:
a boiler which includes means for introducing a fuel, a burner, means for introducing a combustible gas, and a combustion chamber;
a heating unit for directing heat to the vehicle;
a fluid circulation system for circulating a fluid past the vehicle radiator and engine as well as said boiler, said fluid circulation system comprising a main line which divides into a branch line and a bypass-line, said branch line directs the fluid past said heating unit and said bypasss-line directs the fluid around said heating unit and back into communication with said branch line such that the fluid avoids contact with said heating unit; and
control valve means for determining whether the fluid avoids or comes in contact with said heating unit, and wherein said boiler includes an air swirling device, a burner compartment casing at least partially surrounding said swirling device, a vaporizing compartment casing secured to said burner compartment casing, a guide plate positioned within said burner compartment casing between said air swirling device and said vaporizing compartment casing, an ignition plug having a first end positioned to one side of said guide plate and partially within the vaporizing compartment casing.

5. A heating system as recited in claim 4, further comprising means for sensing fluid flow of the fluid being circulated in said fluid circulating system.

6. A heating system as recited in claim 4, wherein said boiler includes a fuel conduit, a fuel filter in line with said conduit and a dosage pump in line with said conduit, said dosage pump including a fixing core, a driving core movable with respect to said fixing core, a bearing member positioned within said fixing core, a piston connected it one end to said driving core and having its second end adapted for travel within said bearing member, a check valve fixedly received within said fixing core to one side of the second end of said piston, an electric coil which, when activated, causes said piston and driving core to move towards said check valve so as to force fuel through said check valve, and a spring for biasing said driving core away from said check valve.

7. A heating system for use with a vehicle having a radiator and an engine, comprising:
a boiler which includes means for introducing a fuel, a burner, means for introducing an combustible gas, and a combustion chamber;
a heating unit for directing heat to the vehicle;
a fluid circulation system for circulating a fluid past the vehicle radiator and engine as well as said boiler, said fluid circulation system comprising a main line which divides into a branch line and a bypass-line, said branch line directs the fluid past said heating unit and said bypass-line directs the fluid around said heating unit and back into communication with said branch line such that the fluid avoids contact with said heating unit;
control valve means for determining whether the fluid avoids or comes in contact with said heating unit, and
wherein said boiler includes a blower positioned within a blowing chamber, said blowing chamber and said combustion chamber being at least partially separated by a dividing plate, said heating system further comprising an ignition sensor comprising an insulation cap and a connecting tube having a first end fixed within a hole formed in said dividing plate and a second end secured to said insulation cap, said ignition sensor further including a light absorbing element secured within said insulation cap for detecting the presence of a flame within said combustion chamber, said boiler further comprising a combustion gas guide plate with a light passage hole formed therein and positioned so as to provide an unobstructed light passageway to said light absorbing element.

8. A heating system for us with vehicle having a radiator and an engine, comprising:
a boiler which includes means for introducing a fuel, means for introducing a combustible gas, and a combustion chamber;
a heating unit for directing heat to the vehicle;
a fluid circulation system for circulating a fluid past the vehicle radiator and engine as well as said boiler; and
said boiler including a fluid jacket formed of a plastic material, a casing defining said combustion chamber and a heat exchanger positioned between said casing and said fluid jacket, said heat exchanger including a protruding exhaust gas conduit at one end which extends through an opening formed in said fluid jacket, said boiler further including a gasket formed of a material which conducts heat at a rate which is less than that of said casing, said gasket surrounding said exhaust gas conduit and being positioned so as to prevent the portion of said fluid jacket defining the opening in said fluid jacket from coming in contact with sad exhaust gas conduit, and said heating system further comprising a radiating cap surrounding and secured to said exhaust gas conduit, said radiating cap including a projection which is dimensioned so as to compress the portion of said fluid jacket defining the opening in said fluid jacket into contact with said gasket.

9. A heating system as recited in claim 8, wherein said gasket is formed of rubber.

10. A heating system as recited in claim 8, wherein said boiler includes a burner and said casing and said heat exchanger are dimensioned and arranged such that exhaust gas from said burner first travels in a first axial direction away from said burner while within said casing, and then in a second axial direction towards said burner while within said casing, then back in the first direction while between said casing and said heat exchanger, and then out an exhaust conduit formed in said heat exchanger.

11. A heating system as recited in claim 8, wherein said boiler includes an air swirling device, a burner compartment casing at least partially surrounding said swirling device, a vaporizing compartment casing secured to said burner compartment casing, a guide plate positioned within said burner compartment casing between said air swirling device and said vaporizing compartment casing, an ignition plug having a first end positioned to one side of said guide plate and partially within the vaporizing compartment casing.

12. A heating system as recited in claim 8, further comprising means for sensing fluid flow of the fluid being circulated in said fluid circulating system.

13. A heating system as recited in claim 8, wherein said boiler includes a fuel conduit, a fuel filter in line with said conduit and a dosage pump in line with said conduit, said dosage pump including a fixing core, a driving core movable with respect to said fixing core, a bearing ember positioned within said fixing core, a piston connected it one end to said driving core and having its second end adapted for travel within said bearing member, a check valve fixedly received within said fixing core to one side the second end of said piston, an electric coil which, when activated, causes said piston and driving core to move towards said check valve so as to force fuel through said check valve, and a spring for biasing said driving core away from said check valve.

14. A heating system as recited in claim 8, wherein said boiler includes a blower positioned within a blowing chamber, said blowing chamber and said combustion chamber being at least partially separated by a dividing plate, said heating system further comprising an ignition sensor comprising an insulation cap and a connecting tube having a first end fixed within a hole formed in said dividing plate and a second end secured to said insulation cap, said ignition sensor further including a light absorbing element secured within said insulation cap for detecting the presence of a flame within said combustion chamber, said boiler further comprising a combustion gas guide plate with a light passage hole formed therein and positioned so as to provide an unobstructed light passageway to said light absorbing element.

15. A heating system as recited in claim 8, wherein said fluid circulation system includes a main line which divides into a branch line and a bypass-line, said branch line directs fluid past said heating unit and said bypass-line directs the fluid around said heating unit and back into communication with said branch line such that the fluid avoids contact with said heating unit; and control valve means for determining whether the fluid avoids or comes in contact with said heating unit.

16. A heating system as recited in claim 8, wherein said radiating cap surrounding and secured to said exhaust gas conduit has a first end and a second end with said first end being positioned further from said fluid jacket than said second end, said first end having a plurality of recesses formed therein and said second end includes said projection which has two side walls converging to a common point.

17. A heating system for use with a vehicle having an engine and a radiator, comprising:
a boiler which includes means for introducing a fuel, means for introducing a combustible gas, a burner, and a combustion chamber;
a fuel introduction system for introducing fuel to said burner, said fuel introduction system including an electrically activated fuel pump;
a heating unit for directing heat to the vehicle.
a fluid circulation system for circulating a fluid past the vehicle radiator and engine and pat said boiler; and a water flow switch positioned in line with said fluid circulation system downstream from said boiler and upstream from said heating unit, said water flow switch comprising a fluid flow monitor for monitoring fluid flow in said circulation system downstream of said boiler and an electric switch in communication with said fluid flow monitor and adapted to cut off electricity to said fuel pump when said fluid monitor detects a lack of fluid flow in said fluid circulation system, and said boiler including a fluid jacket formed of a plastic material, a casing defining said combustion chamber and a heat exchanger positioned between said casing and said fluid jacket, said heat exchanger including a protruding exhaust gas conduit at one end which extends through an opening formed in said fluid jacket, said boiler further including a gasket formed of a material which conducts heat at a rate which is less than that of said casing, said gasket surrounding said exhaust gas conduit and being positioned so as to prevent the portion of said fluid jacket defining the opening in said fluid jacket from coming in contact with said exhaust gas conduit, and said heating system further comprising a radiating cap surrounding and secured to said exhaust gas conduit, said radiating cap including a projection which is dimensioned so as to compress the portion of said fluid jacket defining the opening in said fluid jacket into contact with said gasket.

18. A heating system as recited in claim 17, wherein said fuel system includes a fuel conduit and a fuel filter, and said fuel pump is a dosage pump having a fixing core, a driving core adapted to move with respect to fixing core, a bearing member positioned within core, a piston connected at one end to said driving and having its second end adapted for travel within said member, a check valve fixedly received within said fixing core to one side of the second end of said piston, an electrical coil which, when activated, causes said piston and driving core to move towards said check valve so as to force fuel through said check valve, and a spring for biasing said driving core away from said check valve.

19. A heating system as recited in claim 17, wherein said water flow switch includes a diaphragm adapted for movement in accordance with whether or not fluid is flowing in said fluid circulation system, an electric switch in communication with said fuel pump and driving means for relaying movement of said diaphragm to said electric switch so as to either turn on or off said fuel pump.

20. A heating system for use with a vehicle having an engine and a radiator, comprising:
a boiler which includes means for introducing a fuel, means for introducing a combustible gas, a burner, and a combustion chamber;
a fuel introduction system for introducing fuel to said burner, said fuel introduction system including an electrically activated fuel pump;
a heat unit for directing heat to a vehicle;
a fluid circulation system for circulating a fluid past the vehicle radiator and engine and past said boiler; and
a water flow switch positioned in line with said fluid circulation system downstream from said boiler and upstream from said heating unit, said water-flow switch comprising a fluid flow monitor for monitoring fluid flow in said circulation system downstream of said boiler and an electric switch in communication with said fluid flow monitor and adapted to cut off electricity to said fuel pump when said fluid monitor detects a lack of fluid flow in said fluid circulation system, and wherein said boiler includes a fluid jacket, a combustion chamber casing and a heat exchanger positioned between said casing and said fluid jacket, said casing and said heat exchanger being dimensioned and arranged such that exhaust gas from said burner first travels in a first axial direction sway from said burner while within said casing, and then in a second axial direction towards said burner while within said casing, then back in the first direction while between said casing and said heat exchanger, and then out an exhaust conduit formed in said heat exchanger.

* * * * *